Patented Jan. 23, 1923.

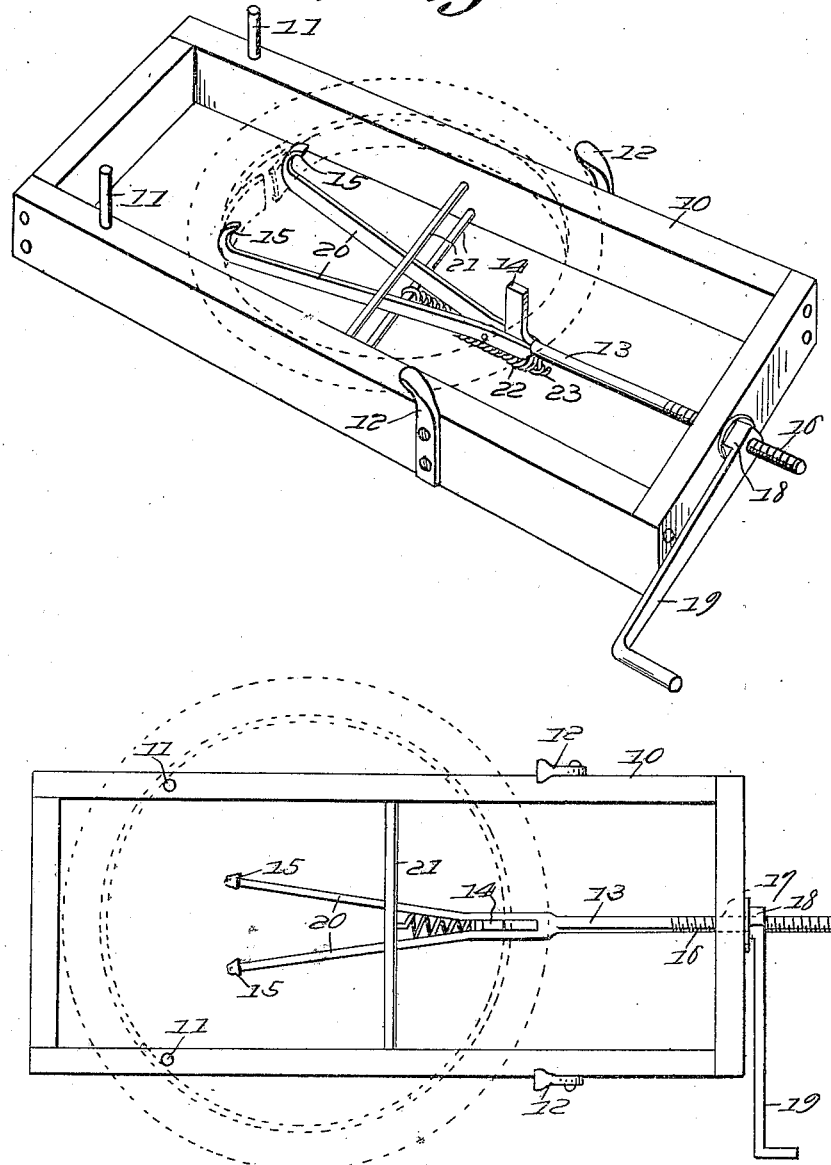

1,443,300

UNITED STATES PATENT OFFICE.

ANDREW J. WEST, OF ANDREWS, SOUTH CAROLINA.

TIRE-RIM EXPANDING AND CONTRACTING IMPLEMENT.

Application filed April 8, 1921. Serial No. 459,546.

*To all whom it may concern:*

Be it known that ANDREW J. WEST, a citizen of the United States of America, residing at Andrews, in the county of Georgetown and State of South Carolina, has invented new and useful Improvements in Tire-Rim Expanding and Contracting Implements, of which the following is a specification.

The object of the invention is to provide a simple and efficient means whereby a demountable tire carrying rim may readily be contracted and expanded in applying a tire to and removing the same from a wheel, under conditions minimizing the effort required of the operator; and with this object in view the invention consists in a construction and combination of parts of which a preferred embodiment is shown in the accompanying drawings, wherein:—

Figure 1 is a perspective view of the apparatus showing a tire and rim applied thereto in position for contraction, said rim and tire being shown in dotted lines.

Figure 2 is a plan view of the same showing in dotted lines a wheel rim and tire applied thereto in position for expansion.

The device consists essentially of a frame 10 carrying rim expanding elements 11 and rim contracting elements 12, a follower 13 arranged for movement in the frame relative to the said rim expanding and contracting elements and carrying complemental rim expanding and contracting elements 14 and 15, operating means for the follower consisting in the construction illustrated of a feed screw 16 extending through a guide opening 17 in one end of the frame and engaged by a feed nut 18 provided with an operating crank 19.

The rim expanding elements 11 and 14 consist of pins and an arm adapted for arrangement within the rim for contact with the inner surface thereof, so that when the follower is moved to cause the arm 14 to recede from the pins 11 the rim is spread or expanded as will be obvious by reference to Figure 1, and the rim contracting elements 12 and 15 consist of hooks directed toward each other for engagement with the rim when interposed therebetween as indicated in Figure 2, so that when the follower is actuated to cause the said hooks to approach each other the rim is collapsed or contracted to release the tire.

Preferably the follower is of forked form having the arms 20 each of which carries a rim contracting element 15 for engagement with the rim at spaced points, and said arms operate between transverse guide rods 21 in the frame while the follower is yieldingly impelled in the direction opposite to that which is necessary in either the expansion or contraction of the rim by a spring 22 terminally attached respectively to one of said guide rods and a hook 23 on the follower.

It will be obvious that by charging a rim with the attached tire upon the frame which constitutes a base or support for the same, in operative relation with either the expanding or contracting elements, that is to say either exteriorly of the stationary and movable expanding elements or interiorly of the stationary and movable contracting elements, the movement of the follower by means of its actuating means will result in either the expansion or contraction of the rim to either engage or release the tire, with the minimum of effort on the part of the operator by reason of the relation of the parts and the leverage afforded by the crank arm attached to the feed screw.

Having described the invention, what is claimed as new and useful is:—

An apparatus for expanding and contracting tire rims consisting of a frame, pins disposed on opposite sides of the frame adjacent one end and upstanding therefrom, hook members disposed also on opposite sides of the frame but at substantially an intermediate point in its length, parallel guide rods spanning the frame at an intermediate point and spaced from each other, a follower having divergent arms disposed between the guide rods and terminally formed with hooks for cooperative action with the hooks carried by the frame, the follower having a feed screw passed slidably through the frame at that end remote from the pins and having an upstanding arm adjacent the divergent arms for cooperative action with said pins, a crank operated feed nut engaged with the said screw and bearing against the end of the frame and a spring tensioned between the guide rod and an intermediate point of the follower to move the latter in a direction opposite to that in which it is normally moved by the feed nut.

In testimony whereof he affixes his signature.

ANDREW J. WEST.